Dec. 23, 1958  J. A. McKAY  2,865,239
BREAK-OFF TOOL
Filed Sept. 6, 1955

INVENTOR.
JOSEPH A. McKAY
BY Paul Bliven
ATTORNEY

United States Patent Office 2,865,239
Patented Dec. 23, 1958

2,865,239

BREAK-OFF TOOL

Joseph A. McKay, Pebble Beach, Calif.

Application September 6, 1955, Serial No. 532,483

3 Claims. (Cl. 81—3)

The present invention relates to a break-off tool and in more particular to a break-off tool for use in severing sections of small tubular devices such as the stems of ball-point pen fillers.

In the manufacture of replacement fillers for ball-point pens it is desirable to make a filler that is long enough to fit those pen barrels requiring the longest kind, and which filler may be easily shortened to fit the shortest barrel. That is the filler should be designed for use in a wide range of lengths.

This universality has been achieved by making the stem of the filler longer than required for most pen barrels, forming annular grooves, or weakened places, at locations along the stem which are appropriate to the various barrel lengths. The stem is then broken by the purchaser-user at one of these weakened places to give the particular desired length by placing two sleeves on the stem of the filler with adjacent ends of the sleeves at such one weakened place but slightly spaced apart, and then bending the stem at this place by means of the two sleeves.

The difficulty, or defect, of the prior art devices has been that three things had to be properly located with respect to each other to obtain proper functioning of the break-off operation. Each sleeve had to be positioned on the stem of the filler independently of the other but in proper relationship to each other and to the stem, and so held while the sleeves were grasped and the stem bent to break it off. The present invention obviates this difficulty of the prior art.

Hence, it is an object of the present invention to devise a break-off tool for use in breaking ball point pen fillers to the proper length, and which tool is easier to use than prior tools.

A further object of the present invention is the devising of a one-piece break-off tool for breaking off ball point pen fillers.

Another object of the present invention is the devising of a tool for breaking off small diameter frangible tubes or rods.

These defects of the prior art are remedied and these objects achieved by using a sleeve which will closely fit but easily slide over the stem of a ball point pen filler, cutting a notch medially of the sleeve so that it is almost severed into two pieces, slightly bending the sleeve at the notched portion so that when slid on the stem, it will grip the stem enough to remain where ever placed, sliding the sleeve onto the stem and locating the notch at the point where it is desired to break the stem, and then grasping the sleeve ends and bending the sleeve and stem at such notch to break the stem. The sleeve is then removed from the stem and discarded along with the unwanted part of the stem.

A device embodying the above outline of features is hereinafter described in detail and shown in the accompanying drawings, in which.

Figure 1:
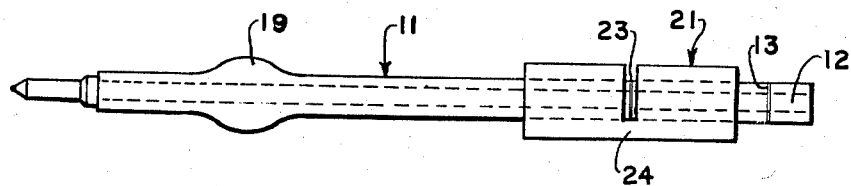
Figure 1 is an elevational view of a ball point pen refill and thereon a break-off tool of the present invention.
Figure 2:
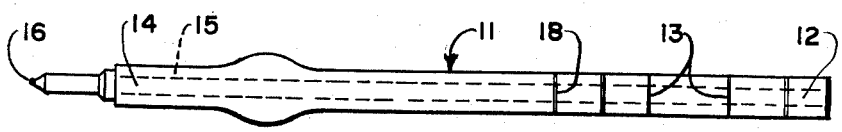
Figure 2 is an elevational view of the ball point pen refill, alone, shown in Figure 1.

The ball point pen refill shown in the drawings is of the conventional kind manufactured by the millions each year. The stem 11 of the refill is a thin walled brass tube which has near one end 12 a series of spaced apart annular grooves 13, or score rings. Each of these grooves weakens the stem at the location of the groove. This end 12 may be called the break-off end. The opposite end 14, the point end, has secured in the bore 15 of the stem the writing ball 16. Ink 17 fills the bore 15 from the ball 16 to just short of the nearest, or lowest score ring 18. A spring shoulder 19 is formed in the tube wall between the point end 14 and the lowest score ring 18. The purpose of this shoulder 19 is no part of the present invention.

Figure 4:
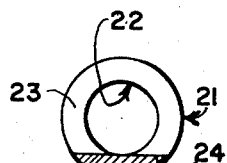
Figure 4 is a section on the line 4—4 of Figure 3.
Figure 3:
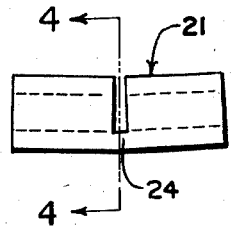
Figure 3 is an elevational view of the ball point break-off tool, alone, shown in Figure 1.

A break-off tool 21 has been shown in Figures 1, 3, and 4. In Figure 1, the tool has been shown in place on the stem of the refill which it fits because it is formed from tubular material having a bore 22 slightly larger than the outside diameter of the stem 11 of the refill. The sleeve need be of a length so that each end may be firmly grasped by the finger tips of an opposite hand. This length is conveniently just under two inches, altho, much greater lengths perform as well. Medially of the sleeve 21 there is formed a transverse slot 23 that is deep enough to render the sleeve easily bent at this midpoint so that the bending in the sleeve will be largely confined to that portion 24 of the material of the sleeve which is below the slot 23, which portion would have been removed if the slot had been continued across the sleeve. Usually the slotting operation is just sufficient to cut across the bore 22 of the sleeve and to leave a straight bottom to the slot. The sleeve may be made of a material which when slotted as shown will bend easily at the slotted portion. Aluminum has been found to be a satisfactory material but other metals and plastics function as well. The slot 23 should be wide enough so that when the sleeve is placed on the stem of a refill and moved therealong, the score rings may be easily seen in the slot and one of them aligned with the slot. During manufacture, or prior to placing the sleeve on the refill stem, the sleeve is bent slightly at the slotted portion. This slight bend gives the sleeve resistance to movement along the stem and holds the sleeve where ever it may be placed on the stem. Thus the sleeve may be placed on the stem with the slot at any desired score ring, and the sleeve will stay in such place until manually moved therefrom. In replacing an old filler with a new one, the two fillers are usually stood along side of each other and the break-off sleeve slid onto the new filler to the place where the slot is even with the end of the old filler. Then a quick glance is given to see that the slot is aligned with a score ring, the sleeve grasped at each end and bent at the slotted portion across the thumbs of the person which are held against the slotted portion 24. A slight bend of the sleeve and the stem is broken. The end of the sleeve remaining on the stem is removed therefrom and the tool and the broken-off section of the stem are discarded or the tool may be saved for future use.

Having thus described my invention, its construction, and use, I claim:

1. A break-off tool, comprising: a sleeve having medially thereof a transverse slot almost severing said sleeve to form a slotted portion and to divide said sleeve into two parts which may be bent with respect to each other at the slotted portion, and said parts being slightly bent with respect to each other at said portion.

2. A break-off tool, comprising: a sleeve having a bore adapted to closely fit but to easily slide over the stem of a ball-point pen refill and having medially thereof a transverse slot almost severing said sleeve to form a slotted portion and to divide said sleeve into two parts which may be bent with respect to each other at the slotted portion, said parts being slightly bent with respect to each other.

3. A break-off tool, comprising: a sleeve having a bore adapted to closely fit but easily slide over the stem of a ball-point pen refill and having a transverse slot almost severing said sleeve to form a slotted portion and to divide said sleeve into two parts which may be bent with respect to each other at the slotted portion, said parts being slightly bent with respect to each other.

References Cited in the file of this patent

UNITED STATES PATENTS 1,956,568     Fjord _____ May 1, 1934